United States Patent
Boutin et al.

(10) Patent No.: US 7,267,397 B2
(45) Date of Patent: Sep. 11, 2007

(54) OPEN ROOF CONSTRUCTION FOR A VEHICLE

(75) Inventors: Robert Joseph Boutin, Madison Heights, MI (US); Todd Andrew Sieting, Holly, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 35 days.

(21) Appl. No.: 10/516,219

(22) PCT Filed: May 30, 2002

(86) PCT No.: PCT/NL02/00345

§ 371 (c)(1),
(2), (4) Date: Sep. 14, 2005

(87) PCT Pub. No.: WO03/101771

PCT Pub. Date: Dec. 11, 2003

(65) Prior Publication Data

US 2006/0091704 A1  May 4, 2006

(51) Int. Cl.
*B60J 7/047* (2006.01)

(52) U.S. Cl. .................. 296/216.03; 296/223

(58) Field of Classification Search ........... 296/216.02, 296/216.03, 216.05, 220.01, 223
See application file for complete search history.

(56) References Cited

U.S. PATENT DOCUMENTS

| | | | |
|---|---|---|---|
| 4,647,106 A * | 3/1987 | Furst | 296/223 |
| 4,893,869 A | 1/1990 | Fuerst | 296/220 |
| 4,995,667 A | 2/1991 | Tamura et al. | 296/216 |
| 5,632,523 A | 5/1997 | Kelm | 296/223 |
| 2002/0021031 A1 | 2/2002 | Kohout et al. | |

FOREIGN PATENT DOCUMENTS

| | | |
|---|---|---|
| DE | 197 13 348 C1 | 7/1998 |
| EP | 0 296 644 | 4/1988 |

OTHER PUBLICATIONS

International Search Report, Feb. 19, 2003.

* cited by examiner

*Primary Examiner*—Dennis H. Pedder
(74) *Attorney, Agent, or Firm*—Todd R. Fronek; Westman, Champlin & Kelly P.A.

(57) ABSTRACT

There is provided an open roof construction for a vehicle having a closure means (4) of which at least one of its forward and rearward edges is movable by a guide mechanism. The guide mechanism comprises a stationary guiding (7), a slide (12) engaging said guiding and a link member (16) that in a sliding and hingeable manner engages the stationary guiding, such that when the slide (12) moves the respective edge of the closure means (4) not only moves along with the slide but also is moved away or towards the vehicle.

22 Claims, 10 Drawing Sheets

OPEN ROOF CONSTRUCTION FOR A VEHICLE

CROSS-REFERENCE TO RELATED APPLICATION

This Application is a Section 371 National Stage Application of International Application No. PCT/NL02/0345 filed May 30, 2002 and published as WO 03/101771 on Dec. 11, 2003 in English.

BACKGROUND OF THE INVENTION

The invention relates to a novel open roof construction for a vehicle.

It is an object of the present invention to further improve such an open roof construction for a vehicle.

SUMMARY OF THE INVENTION

Thus, in accordance with the present invention an open roof construction for a vehicle is provided, comprising a roof opening defined in a fixed roof construction of the vehicle, and a panel-shaped closure means for the roof opening movable between a closing position for closing said roof opening and an opening position for at least partially exposing said roof opening, said closure means having a forward edge and a rearward edge, wherein during transition of the closure means from one of said positions towards the other of said positions at least one of said forward and rearward edges of the closure means also is moved in a direction towards or away from, respectively, the fixed roof construction, and wherein a guide mechanism is provided for the movement of at least one of said edges of the closure means, said guide mechanism comprising:

- a stationary guiding attached to the fixed roof construction and extending in the longitudinal direction of the vehicle;
- a slide engaging the guiding and being driven by a drive means for a guided movement along the guiding;
- a link member having a first end that hingeably engages the closure means and an opposite second end that slidingly and hingeably engages the stationary guiding, and which link member further is operatively connected to the slide in such a manner, that when the slide moves from a position in which the closure means closes the roof opening towards a position in which the closure means exposes the roof opening the link member firstly rotates such as to move the respective edge of the closure means away from the fixed roof construction and thereafter moves along with the slide while maintaining its rotated position such as to move the closure means substantially in parallel to the guiding.

By means of such an open roof construction the movement of the closure means is realised in an effective manner.

Preferred embodiments of the open roof construction according to the present invention are described in the depending subclaims.

The invention further relates to a coupling member for temporarily coupling two parts of an open roof construction which are movable along a stationary guiding.

In accordance with the present invention, the coupling member is guided in the stationary guiding and carries a pivot arm, a free end of which is provided with a guide projection co-operating with a curved track defined in the stationary guiding, said pivot arm further comprising an engagement member which, when a first one of the open roof parts moves in a first direction, engages a projection of said first part when the pivot arm is in a first one of its extreme pivot positions as defined by the co-operation between the guide projection and the curved track, whereas the engagement member disengages the projection of said first open roof part when the pivot arm has reached its second extreme pivot position, and wherein the first part further is provided with an abutment means which, when the first part moves in an opposite direction, will engage the coupling member, and wherein the coupling member is connected to the second one of the open roof parts.

BRIEF DESCRIPTION OF THE DRAWINGS

Hereinafter the invention will be elucidated while referring to the drawing, in which an embodiment of the open roof construction according to the invention is illustrated.

DETAILED DESCRIPTION OF THE ILLUSTRATIVE EMBODIMENTS

Figure 10:
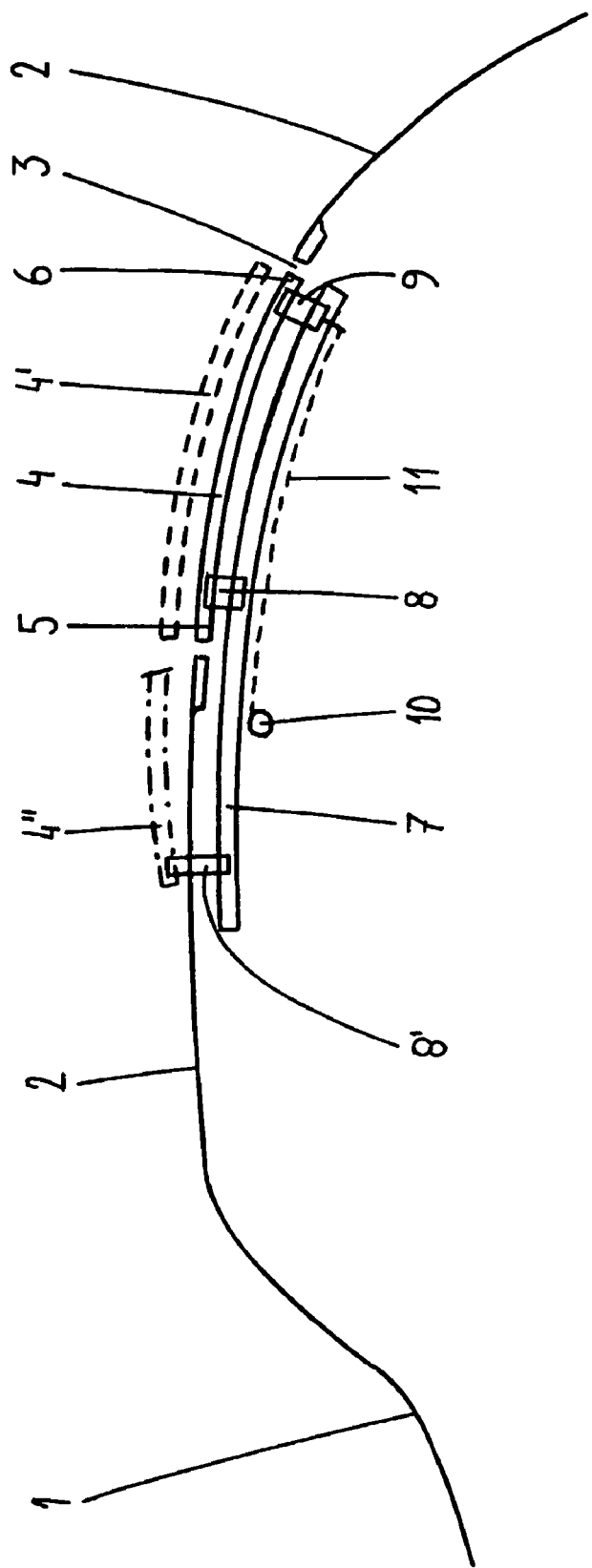
FIG. 10 shows, schematically, part of a vehicle provided with an open roof construction in accordance with the present invention.

Firstly referring tot FIG. 10 there is schematically shown a vehicle 1 with a fixed roof construction 2. A roof opening 3 is defined in the fixed roof construction 2 and a panel-shaped closure means 4 is provided which is movable between a closing position 4 (indicated in full lines) for closing said roof opening 3 and an opening position 4" (indicated in chain dotted lines) for at least partially exposing said roof opening 3. While moving from the closing position toward the opening position, the closure means 4 firstly reaches a position 4' (indicated in dotted lines) and then moves towards the opening position 4".

The closure means 4 has a forward edge 5 and a rearward edge 6 (as seen in the longitudinal direction of the vehicle 1) which each co-operate with a stationary guiding 7 by means of forward and rearward, respectively, means 8 and 9. It is noted, that the position of the closure means, stationary guiding 7 and forward and rearward means 8 and 9 is only schematically indicated in FIG. 10. Further one can see, that in the opening position of the closure means 4" the forward means 8 has reached a new position 8'. The same applies for the rearward means 9 but this has not been indicated in this figure.

In the embodiment shown in FIG. 10 a drive member 10 (for example an electric motor) is shown connected to the rearward means 9 through a drive means 11 (for a example a Bowden cable) for operating the open roof construction.

For explaining the guide mechanism of the rearward edge 6 of the closure means 4, now reference is made to FIGS. 1-4 illustrating successive positions of such a guide mechanism.

Figure 1:
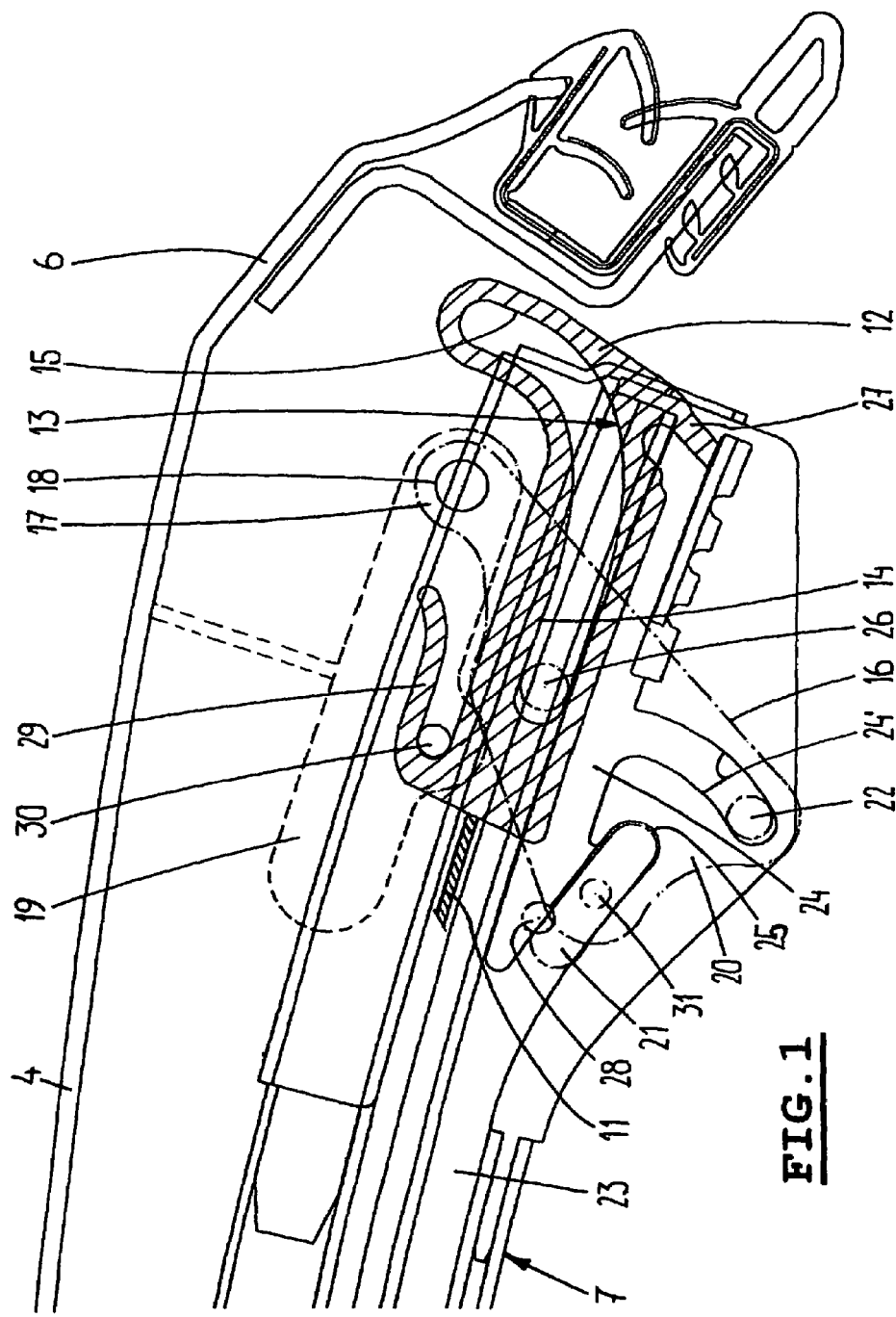
FIG. 1 shows an embodiment of a first guide mechanism in a first position thereof.

Firstly referring to FIG. 1, the most rearward section of the stationary guiding 7 together with the rearward edge 6 of the closure means 4 are illustrated. As indicated before, the stationary guiding 7 is attached to the fixed roof construction 2 of the vehicle 1 and extends basically in the longitudinal direction of the vehicle. A slide 12 (shown in a hatched manner) engages the guiding 7 and is driven by the drive means 11 for a guided movement along the guiding 7. The slide 12 is provided with a curved track 13 comprising a first part 14 extending substantially in parallel to the direction of movement of the slide 12 along the stationary guiding 7, and an arc-shaped second part 15 diverging therefrom towards the closure means 4.

Further, there is provided a link member 16 having a first end 17 that hingeably 18 engages an arm 19 attached to the closure means 4. The link member 16 further has an opposite second end 20 to which is rotatably attached a first link member guide 21 (e.g. a slide block). A second link member guide 22 (e.g. a slide pin) is also attached to the opposite second end 20 of the link member 16.

The stationary guiding 7 comprises a first link member guide track 23 that houses the first link member guide 21 of the link member 16. Further, the stationary guiding 7 comprises a second link member guide track 24, 24' which has a first section 24 extending in parallel to the first link member guide track 23, and an arc-shaped second section 24' extending transversely thereto. The second link member guide 22 co-operates with said second link member guide track 24, 24' in a manner to be described later.

As can be seen in FIG. 1, the first link member guide 21 and second link member guide 22 are spaced apart some distance.

The end of the first link member guide track 23 defines a stop 25 limiting the extreme position of the first link member guide 21.

The link member 16 further is provided with a coupling pin 26 positioned somewhere between its first end 17 and opposite second end 20. This coupling pin 26 is housed within the curved track 13 of the slide 12.

The slide 12 also is provided with a hook member 27 which, in a manner to be described later, can engage a co-operating part 28 of the link member 16. Further the slide 12 is provided with a locking member shaped as a hook 29 for locking a pin 30 attached to the closure means 4 when the latter is in its closing position as illustrated in FIG. 1.

The rearward guide mechanism operates in the following manner: starting from the closing position of the closure means 4 illustrated in FIG. 1, an activation of the drive means 11 by means of the drive member 10 will move the slide 12 to the left. During this motion the coupling pin 26 of the link member 16 firstly moves through the first part 14 of the curved track 13. Meanwhile the locking member 29 will disengage the pin 30 of the closure means 4. During this first stage of the movement of the slide 12 the link member 16 will maintain its position as shown in FIG. 1, in which its first link member guide 21 rests against the stop 25, while its second link member guide 22 is positioned at the end of the arc-shaped second section 24' of the second link member guide track.

When the slide 12 has moved to the left (as seen in FIG. 1) sufficiently, the coupling pin 26 of the link member 16 reaches the arc-shaped second part 15 of the curved track 13 of the slide 12, and thus a rotation of the link member 16 will occur. This rotation is enabled by an axis of rotation 31 between the link member 16 and its first link member guide 21. During this rotation of the link member 16 the second link member guide 22 moves through the arc-shaped second section 24' of the second link member guide track. As long as the second link member guide 22 is within the arc-shaped second section 24'' the first link member guide 21 will not move in the first link member guide track 23.

Figure 2:
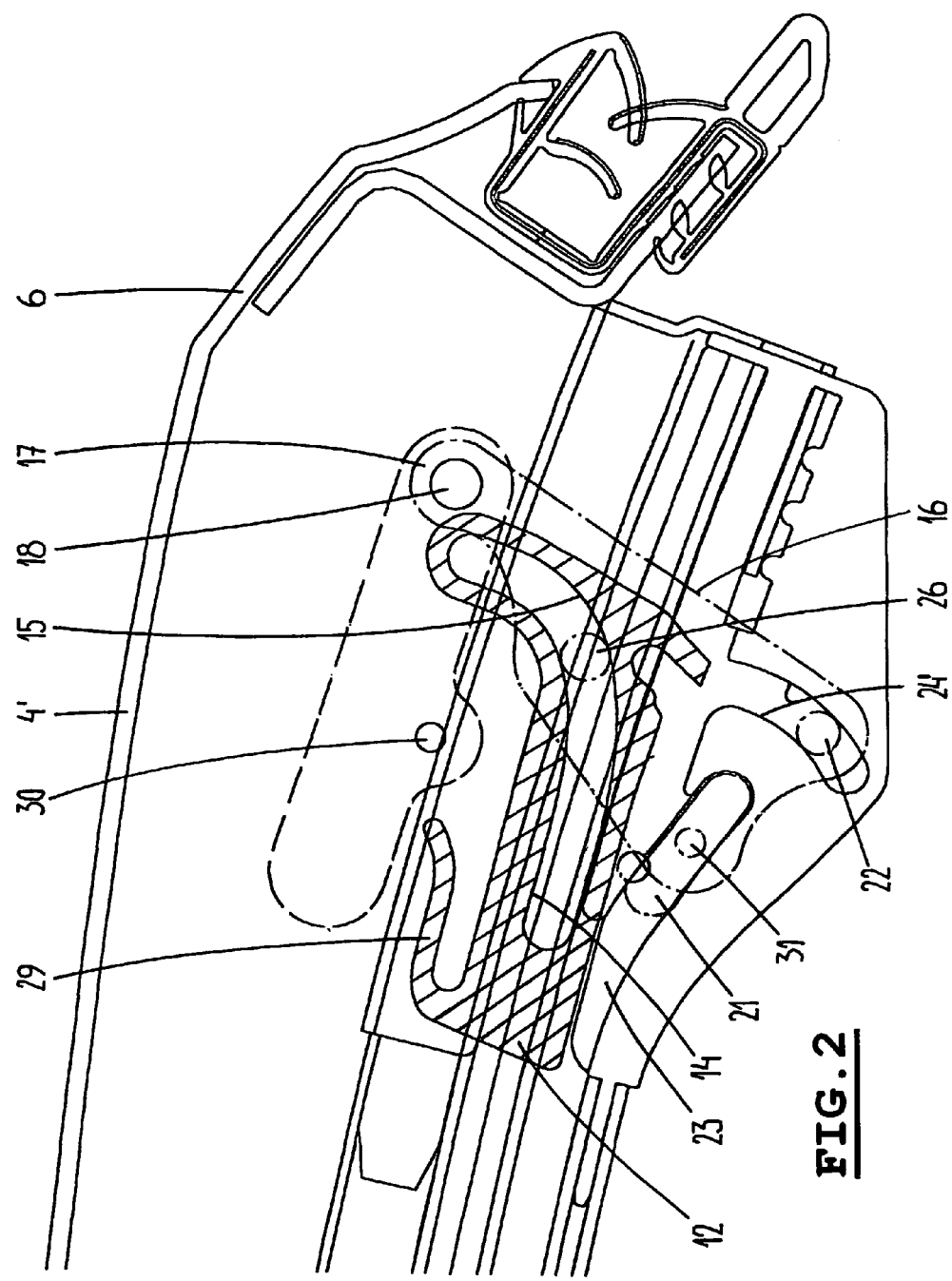
FIG. 2 shows the same guide mechanism in a second position thereof.

As a result of the rotation of the link member 16, its first end 17 with hingeable connection 18 to the closure means 4 will move away from the fixed roof construction or stationary guiding 7, and as a result the rearward edge 6 of the closure means 4 will move in a direction away from the fixed roof construction (or stationary guiding 7). It is noted that during this movement of the closure means 4 it also will move slightly in a forward direction (to the left as seen in FIG. 2).

Figure 3:
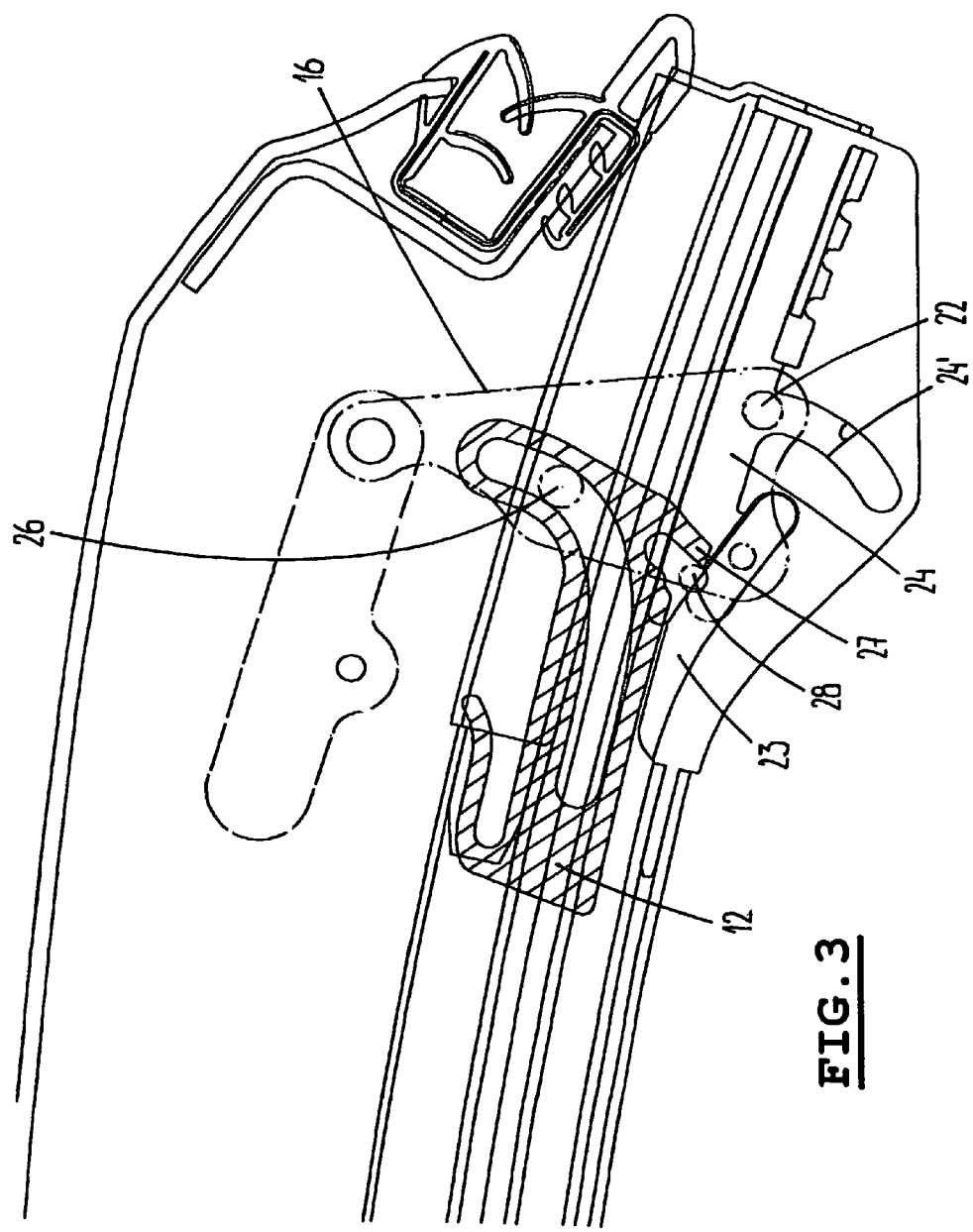
FIG. 3 shows the same guide mechanism in a third position thereof.

Such a movement of the closure means 4 away from the fixed roof construction 2 is allowed, because the locking member 29 has completely disengaged the pin 30 of the closure means 4. When the slide 12 has moved still further to the left (FIG. 3) the link member 16 is rotated that far, that its second link member guide 22 has reached the connection between the first section 24 and the arc-shaped second section 24' of the second link member guide track. At this moment the hook member 27 of the slide 12 starts to engage the co-operating part 28 of the link member 16 (which in the embodiment illustrated is part of the first link member guide 21) and thus will entrain the link member 16. A movement of the link member 16 to the left (as seen in FIG. 3) now is possible, because the second link member guide 22 has left the arc-shaped second section 24' of the second link member guide track. During such a movement of the link member 16 to the left its first link member guide 21 will move to the left in the first link member guide track 23, whereas its second link member guide 22 will move to the left in the first section 24 of the second link member guide track. As a result of such a movement, the closure means 4 also will be moved to the left. Basically, the rotational position of the link member 16 will not change anymore during such a movement to the left.

It is noted, that during the further movement of the guide mechanism to the left, the first link member guide 21 and the second link member guide 22 of the link member 16 will co-operate with the respective first link member guide track 23 and second link member guide track 24, such that a rotation of the link member 16 will be prevented.

Figure 4:
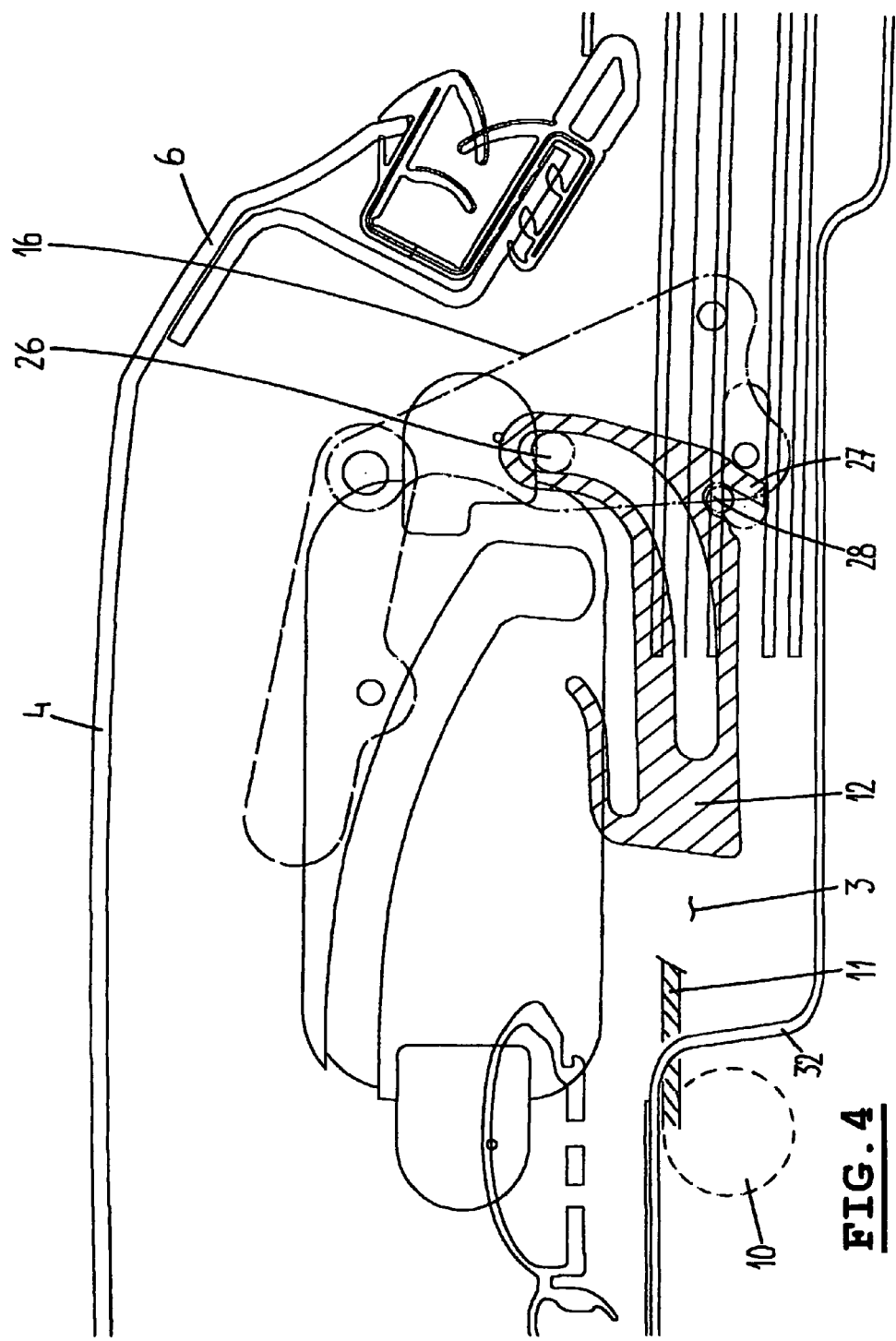
FIG. 4 shows the same guide mechanism in a fourth position thereof.

In FIG. 4 a position of the closure means 4 is shown which basically corresponds with its opening position. The rearward edge 6 of the closure means 4 nearly has reached a forward edge 32 of the roof opening 3. As can be seen, the link member 16 still is in its rotated position. The co-operating part 28 of the link member 16 is completely engaged by the hook member 27 of the slide 12.

When starting from the opening position illustrated in FIG. 4, the closure means 4 has to be moved to the closing position illustrated in FIG. 1, the slide 12 is moved to the right by the drive member 10 and drive means 11. Because a rotation of the link member 16 is not yet possible, the coupling pin 26 will maintain its position relative to the arc-shaped second part 15 of the curved track 16 of the slide 12. Thus the link member 16, and therefore the closure means 4, are moved along with the slide 12 to the right.

When the slide 12 has moved to the right sufficiently far, the first link member guide 21 will engage the stop 25, at which moment the second link member guide 22 has reached the connection between the first section 24 and arc-shaped second section 24' of the second link member guide track (FIG. 3). Then, a rotation of the link member 16 will occur, during which the coupling pin 26 will move along the arc-shaped second part 15 towards the first part 14 of the curved track 13, while the second link member guide 22 moves into the arc-shaped second section 24' of the second link member guide track. As a result the closure means 4 moves towards the fixed roof construction 2. When the second link member guide 22 has reached the end of the arc-shaped second section 24' of the second link member guide track the locking member 29 will engage the pin 30 and will firmly pull the closure means 4 against the fixed roof construction 2.

Next a guide mechanism provided for the movement of the forward edge 5 of the closure means 4 will be discussed while referring tot FIGS. 5-7.

Figure 5:
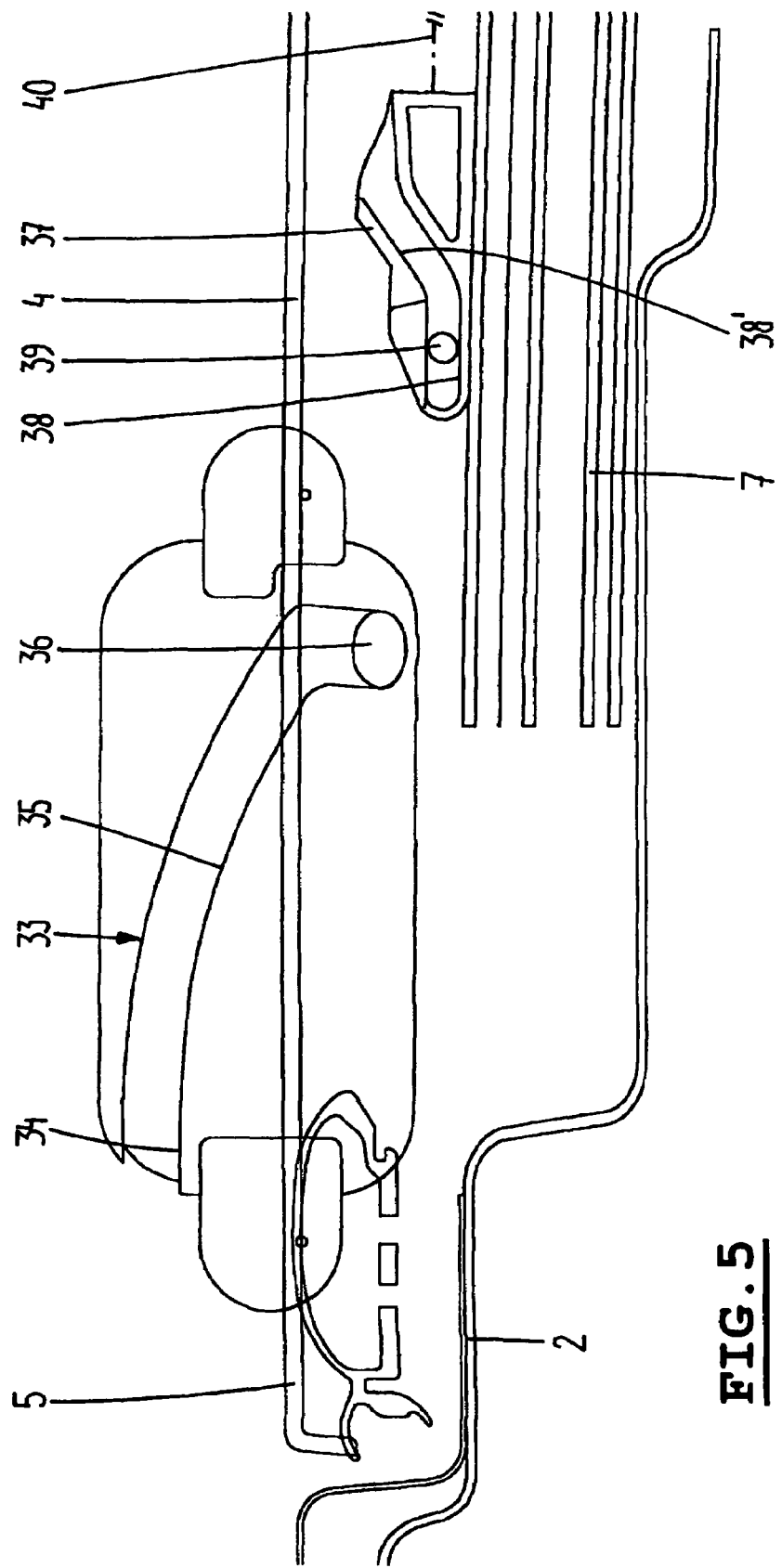
FIG. 5 shows a second guide mechanism in a first position thereof.

In FIG. 5 the forward edge 5 of the closure means 4 is in a position (closing position of the closure means 4) which basically corresponds with the position of the rearward edge 6 illustrated in FIG. 1. A stationary guide track 33, which is attached to the fixed roof construction 2 in a manner not shown in detail, comprises a first section 34 which forwardly extends substantially in parallel to the stationary guiding 7 and which backwardly merges into a second section 35 extending transversely thereto in the direction of the fixed roof construction 2 or stationary guiding 7. It is noted, that in the figures only the first part of the first section 34 is illustrated; this first section 34 will extend further to the left along teh fixed roof construction 2. A first guide pin 36 is, in a manner not shown in detail, attached to the closure means 4 and, in the closing position of the closure means 4, is positioned at the end of the second section 35 of the stationary guide track 33.

The guide mechanism for the forward edge 5 further comprises a latching member 37 that can move along the stationary guiding 7. This latching member 37 comprises a latching track 38, 38' with a first part 38 substantially in parallel with the stationary guiding 7 and a second part 38' diverging backwardly therefrom towards the closure means 4. The closure means 4 comprises a second guide pin 39 to be engaged by the latching track 38, 38', and housed in the first part 38 thereof when the closure means 4 is in its closing position.

In a manner to be described later, the latching member 37 is connected with the slide 12 for at least temporarily moving therewith along the stationary guiding 7. Such a connection may be realised by means of a flexible cable 40, such as for example a Bowden cable.

Figure 6:
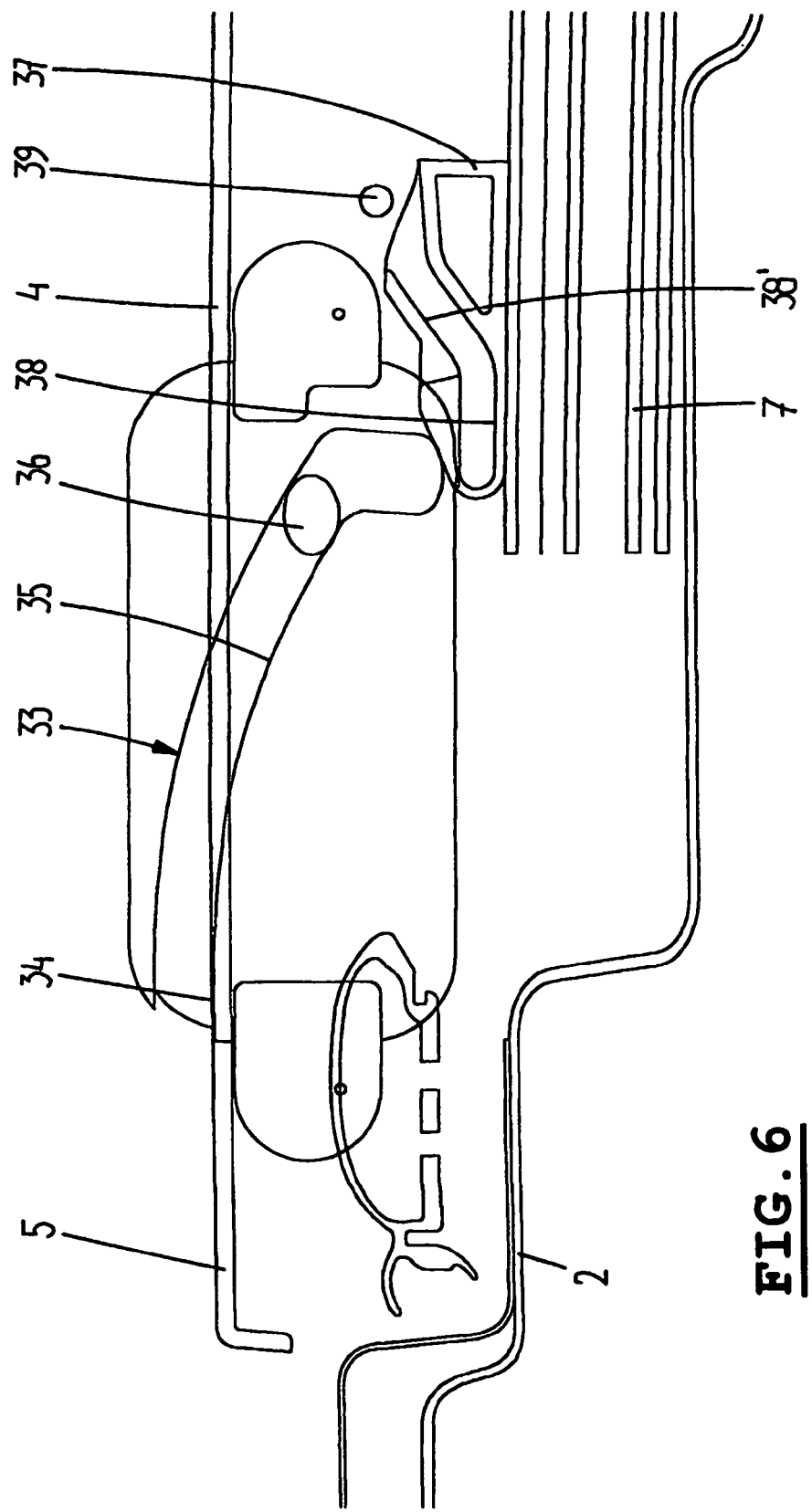
FIG. 6 shows said second guide mechanism in a second position thereof.

Referring to FIG. 6, the latching member 37 has moved to the left to such an extent, that the second guide pin 39 has followed the first part 38 and next the second part 38' of the latching track and has left this latching track. As a result the forward edge 5 of the closure means 4 has been raised, such that the first guide pin 36 of the closure means 4 is moved upwardly in the second section 35 of the stationary guide track 33. This position of the forward edge 5 of the closure means 4 basically corresponds with the position of the rearward edge 6 as illustrated in FIG. 3.

Figure 7:
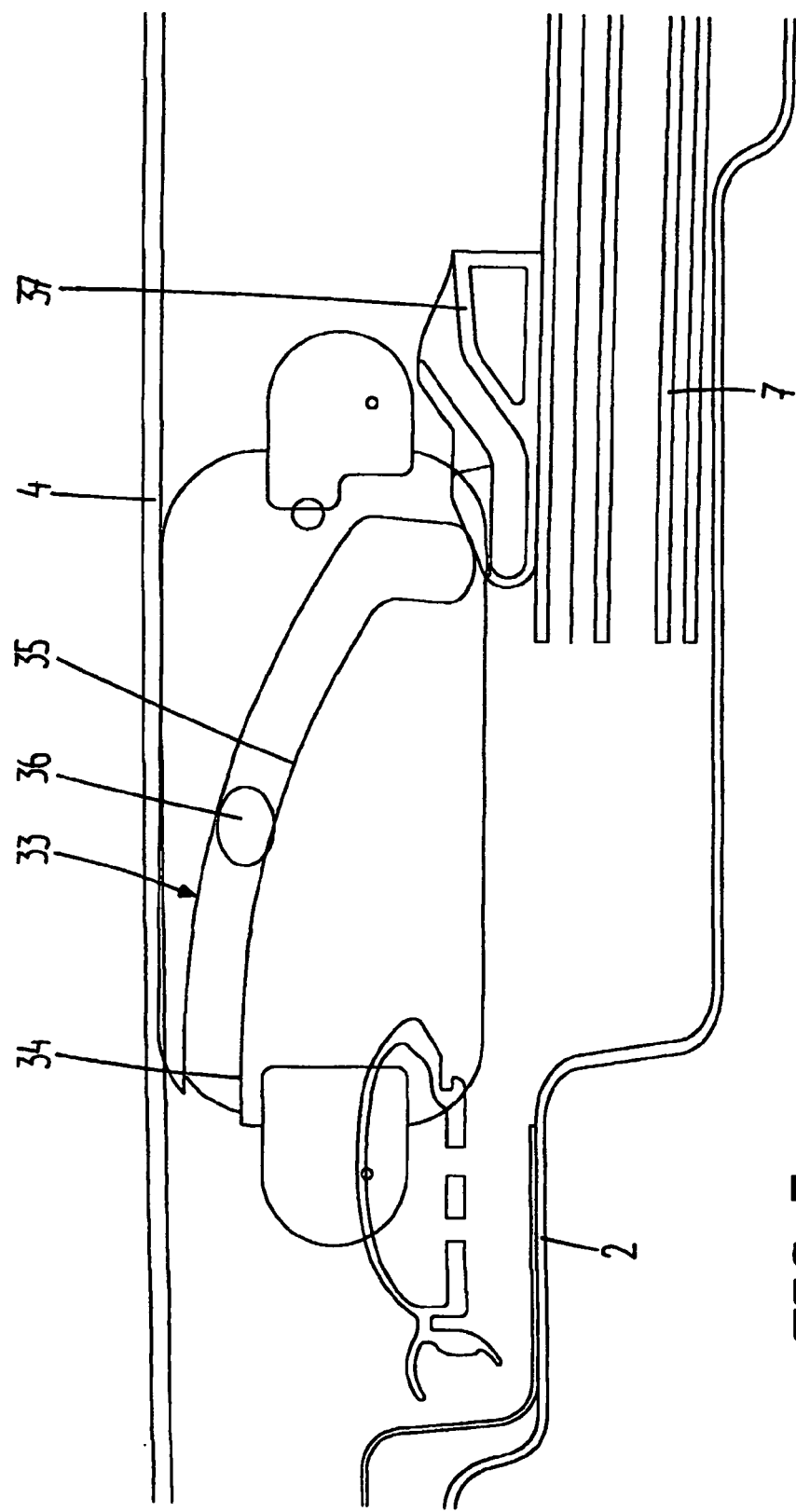
FIG. 7 shows said second guide mechanism in a third position thereof.

Because now the latching member 37 has disengaged the second guide pin 39 of the closure means 4, the closure means 4 is free to move to the left, as explained before in relation to the guide mechanism for the rearward edge 6, whereby the first guide pin 36 moves further towards the first section 34 of the stationary guide track 33 (FIG. 7). During a further movement of the closure means 4 to the left (forward direction of the vehicle 1) the first guide pin 36 of the closure means 4 will follow the first section 34 of the stationary guide track 33 until the closure means 4 has reached its opening position (for example as shown in FIG. 4, in which the rearward edge 6 is near to the forward edge 32 of the roof opening 3).

After the latching member 37 has disengaged the second guide pin 39 as illustrated in FIG. 6, a further movement of the latching member 37 is no longer necessary. The connection between the latching member 37 and the slide 12 therefore is such, that the latching member 37 only temporarily moves along with the slide 12, as indicated before. A mechanism for realising such a temporarily common motion between the latching member 37 and the slide 12 will now be explained while referring to FIGS. 8 and 9.

Figure 8:
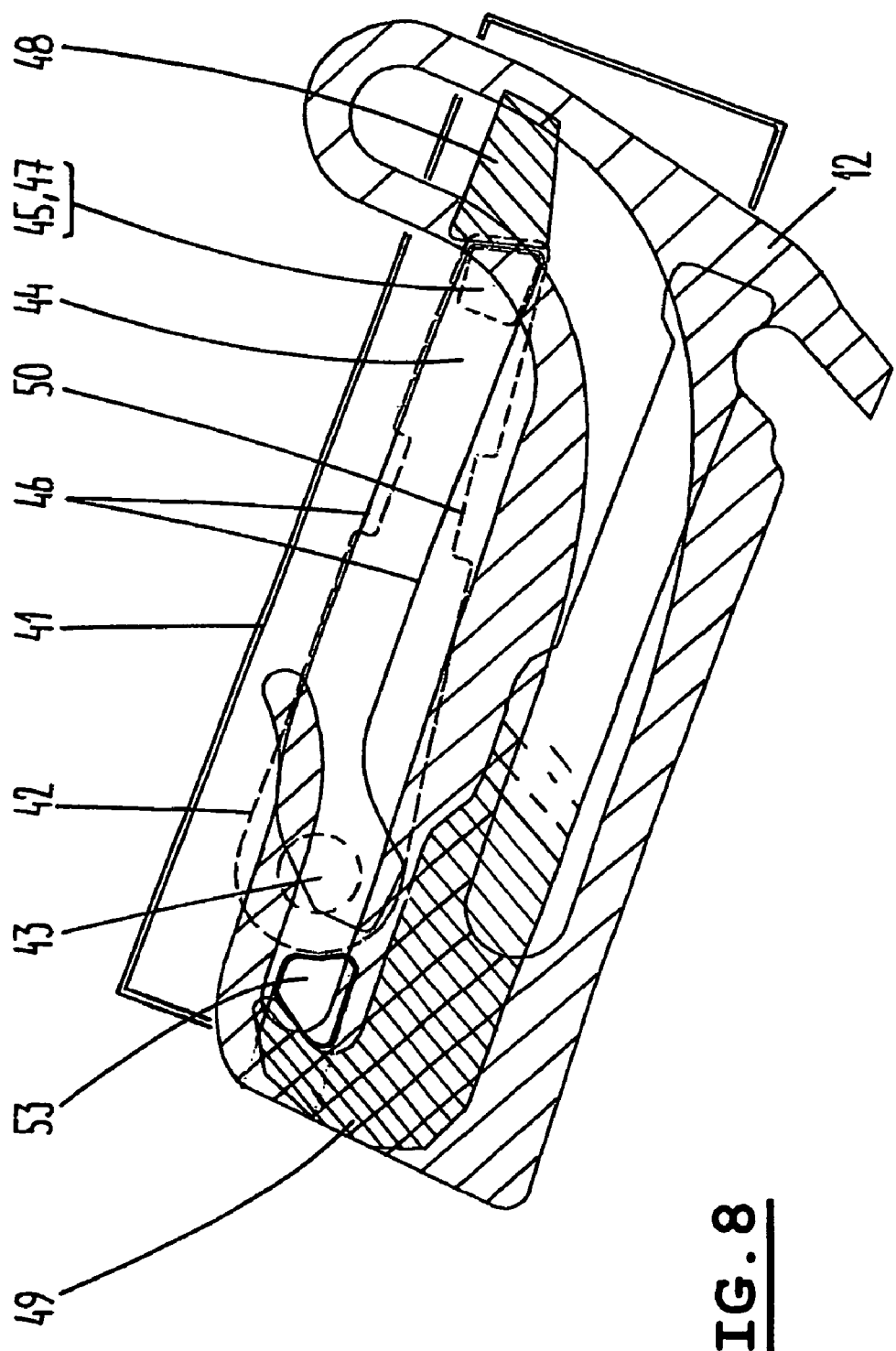
FIG. 8 shows, schematically, an embodiment of a coupling member according to the invention in a first position thereof.

Referring to FIG. 8, the slide 12 is shown in a hatched manner. Further a frame 41 (schematically indicated by double lines) of a coupling member is shown. In a manner not shown in detail this frame or coupling member 41 is movable along the stationary guiding 7 (see FIG. 9). The frame 41 of the coupling member carries a pivot arm 42 (indicated in dotted lines) having a pivot axis 43. A free end 44 of the pivot arm 42 is provided with a guide projection 45 co-operating with a curved track 46 defined in the stationary guiding 7. Further, the pivot arm 42 comprises an engagement member 47 which, in the embodiment shown and as illustrated in FIG. 8, coincides with the guide projection 45.

The slide 12 is provided with a projection 48 which can engage the engagement member 47 of the pivot arm 42 when the pivot arm 42 is in the position as shown in FIG. 8 and as defined by the curved track 46. Thus, when the slide 12 moves to the left, the projection 48 pushes against the engagement member 47 and thus takes the pivot arm 42 and the frame 41 of the coupling member also to the left.

Figure 9:
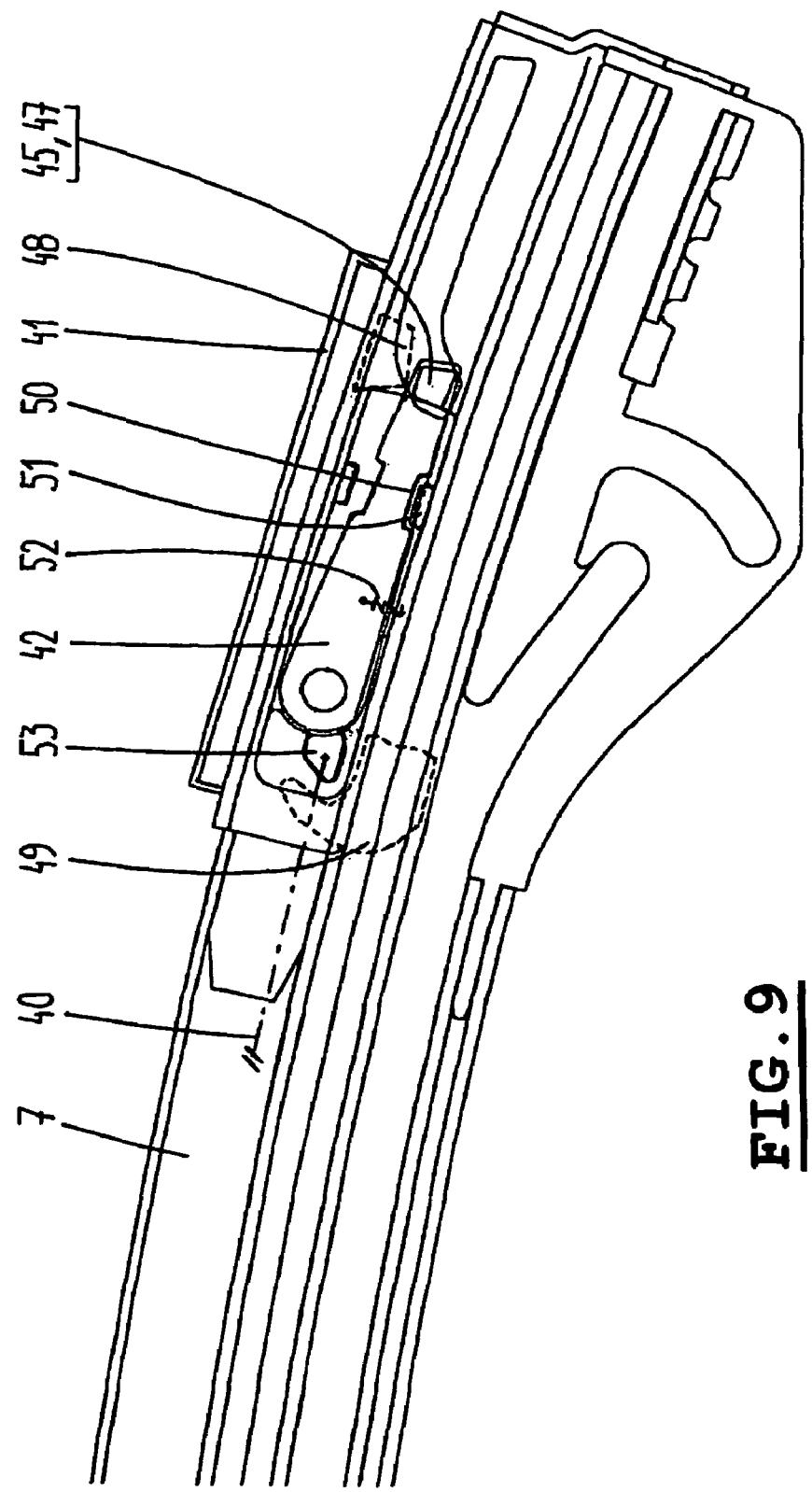
FIG. 9 shows said coupling member in a second position thereof.

While moving to the left, the guide projection 45 follows the curved track 46 and will reach the position as shown in FIG. 9. In this position, the pivot arm 42 has pivoted downwardly, such that the engagement member 47 no longer engages the projection 48 of the slide 12 (slide 12 is not indicated in FIG. 9, only its projection 48 and an abutment means 49 to be described later).

When the pivot arm 42 has reached the position as illustrated in FIG. 9, a further movement of the slide 12 to the left will not lead anymore to a corresponding movement of the coupling member to the left. Thus, the coupling member then maintains its position.

The pivot arm 42 is provided with a recess 50 which, in the pivot position illustrated in FIG. 9, co-operates with a projection 51 of the stationary guiding 7. The co-operation between the recess 50 and projection 51 defines and maintains the position of the coupling member.

For securely maintaining this position of the pivot arm 42, it is possible that the pivot arm 42 is spring loaded towards its second pivot position by means of a spring member 52.

The connection between the coupling member (frame 41) and the latching member 37 may be realised by the flexible cable 40, as indicated before. An additional abutment means 53 attached to the frame 41 engages the pivot arm 42, thus ensuring an effective transfer of the force exerted on the pivot arm 42 by the projection 48 of the slide 12.

As indicated in FIG. 8 and FIG. 9 the slide 12 further is provided with an abutment means 49. When the slide 12 moves back to the right to its original position as shown in FIG. 8 (closing position of the closure means 4) this abutment means 49 will engage a coupling member, for example the abutment means 53 thereof, and thus moves the coupling means along to the right. During this movement of the coupling means the pivot arm 42, due to the co-operation between the guide projection 45 and the curved track 46, will pivot to its pivot position as illustrated in FIG. 8, in which the engagement member 47 of the pivot arm 42 is again in a position to be engaged by the projection 48 of the slide 12.

As a result of the described embodiment of the coupling member, the latching member 37 of the guide mechanism of the forward edge 5 of the closure means 4 is connected to the slide 12 in such a manner, that the latching member 37 only moves together with the slide 12 until the second guide pin 39 (FIG. 5) has moved out of the latching track 38, 38' of the latching member 37. Thus, the situation illustrated in FIG. 9 basically corresponds with the situation illustrated in FIG. 6.

The coupling member described before also could be provided between another pair of parts of an open roof construction, which are movable along a stationary guiding 7.

The invention is not limited to the embodiment described before which may be varied widely within the scope of the invention as defined by the claims.

The invention claimed is:

1. An open roof construction for a vehicle, comprising:
  a roof opening defined in a fixed roof construction of the vehicle;
  a panel-shaped closure means for the roof opening movable between a closing position for closing said roof opening and an opening position for at least partially exposing said roof opening, said closure means having a forward edge and a rearward edge, wherein during transition of the closure means from one of said positions towards the other of said positions at least one of said forward and rearward edges of the closure means also is moved in a direction towards or away from, respectively, the fixed roof construction; and
  a guide mechanism providing for the movement of at least one of said edges of the closure means, said guide mechanism comprising:
    a stationary guiding attached to the fixed roof construction and extending in the longitudinal direction of the vehicle;
    a slide engaging the stationary guiding and being driven by a drive means for a guided movement along the stationary guiding; and
    a link member having a first end that hingeably engages the closure means and an opposite second end that slidingly and hingeably engages the stationary guiding, and which link member further is operatively connected to the slide in such a manner, that when the slide moves from a position in which the closure means closes the roof opening towards a position in which the closure means exposes the roof opening the link member firstly rotates such as to move the respective edge of the closure means away from the fixed roof construction and thereafter moves along with the slide while maintaining its rotated position such as to move the closure means substantially in parallel to the guiding, wherein the stationary guiding comprises:
      a first link member guide track that houses a first link member guide attached to said opposite second end of the link member; and
      a second link member guide track that houses a second link member guide attached to said opposite second end of the link member at a distance from the first link member guide, wherein the second link member guide track has a first section extending in parallel to the first link member guide track and an arc-shaped second section extending transversally thereto, and wherein the first link member guide track is provided with a stop, such that when the first link member guide engages the stop the second link member guide is positioned at a connection between the first section and the arc-shaped second section of the second link member guide track.

2. The open roof construction according to claim 1, wherein the slide is provided with a curved track and the link member is provided with a coupling pin positioned intermediate its first end and opposite second end and housed within the curved track.

3. The open roof construction according to claim 2, wherein the curved track comprises, a first part extending substantially in parallel to the direction of movement of the slide, and an arcshaped second part diverging therefrom towards the closure means.

4. The open roof construction according to claim 1, wherein the slide comprises a locking member for locking a pin of the closure means when the latter is in its closing position.

5. The open roof construction according to claim 4, wherein the locking member is a hook.

6. The open roof construction according to claim 1, wherein the slide comprises a hook member for engaging a co-operating part of the link member in its rotated position.

7. The open roof construction according to claim 1, wherein the respective edge of the closure means is the rearward edge.

8. The open roof construction according to claim 7, wherein further a guide mechanism is provided for the movement of the forward edge of the closure means, said guide mechanism comprising:
  a stationary guide track attached to the fixed roof construction, with a first section forwardly extending substantially in parallel to the stationary guiding and backwardly merging into a second section extending transversally thereto in the direction of the fixed roof construction;
  a first guide pin attached to the closure means and engaging said stationary guide track; and
  a latching member connected with the slide for at least temporarily moving therewith along the stationary guiding, said latching member comprising a latching track with a first part substantially in parallel with the stationary guiding and a second part diverging backwardly therefrom towards the closure means, whereas the closure means comprises a second guide pin to be engaged by the latching track of the latching member when the closure means moves towards the closing position.

9. The open roof construction according to claim 8, wherein the latching member is connected to the slide by a coupling member in such a manner, that the latching member only moves together with the slide until the second guide pin of the closure means has moved out of the latching track.

10. The open roof construction according to claim 9, wherein the coupling member is guided in the stationary guiding and carries a pivot arm, a free end of which is provided with a guide projection co-operating with a curved track defined in the stationary guiding, said pivot arm further comprising an engagement member which, when the slide moves in a direction for opening the closure means, engages a projection of the slide when the pivot arm is in a first one of its extreme pivot positions as defined by the co-operation between the guide projection and the curved track, whereas the engagement member disengages the slide projection when the pivot arm has reached its second extreme pivot position, and wherein the slide further is provided with an abutment means which, when the slide moves in a direction for closing the closure means, will engage the coupling member.

11. The open roof construction according to claim 10, wherein the pivot arm is spring loaded toward its second pivot position in which the engagement member disengages the projection of the slide.

12. The open roof construction according to claim 10, wherein the pivot arm is provided with a recess co-operating with a projection of the stationary guiding for defining the position of the coupling member in its second extreme pivot position.

13. The open roof construction according to claim 9, wherein the latching member is connected to the coupling member by means of a flexible cable.

14. The open roof construction according to claim 1, wherein the drive means for the slide is a flexible cable.

15. A coupling member for temporarily coupling a first part and a second part of an open roof construction which are movable along a stationary guiding, wherein the coupling member is guided in the stationary guiding and carries a pivot arm, a free end of which is provided with a guide projection co-operating with a curved track defined in the stationary guiding, said pivot arm further comprising an engagement member which, when the first part of the open roof construction moves in a first direction, engages a projection of said first part when the pivot arm is in a first one of its extreme pivot positions as defined by the co-operation between the guide projection and the curved track, whereas the engagement member disengages the projection of said first part when the pivot arm has reached its second extreme pivot position, and wherein the first part further is provided with an abutment means which, when the first part moves in an opposite direction, will engage the coupling member, and wherein the coupling member is connected to the second part of the open roof construction.

16. The coupling member according to claim 15, wherein the pivot arm is spring loaded toward its second pivot position in which the engagement member disengages the projection of the first part.

17. The coupling member according to claim 16, wherein the pivot arm is provided with a recess co-operating with a projection of the stationary guiding for defining the position of the coupling member in its second pivot position.

18. The coupling member according to claim 15, wherein the coupling member is connected to the second part by means of a flexible cable.

19. An open roof construction for a vehicle, comprising:
a roof opening defined in a fixed roof construction of the vehicle;
a panel-shaped closure means for the roof opening movable between a closing position for closing said roof opening and an opening position for at least partially exposing said roof opening, said closure means having a forward edge and a rearward edge, wherein during transition of the closure means from one of said positions towards the other of said positions at least one of said forward and rearward edges of the closure means also is moved in a direction towards or away from, respectively, the fixed roof construction; and
a guide mechanism providing for the movement of at least one of said edges of the closure means, said guide mechanism comprising:
a stationary guiding attached to the fixed roof construction and extending in the longitudinal direction of the vehicle;
a slide engaging the stationary guiding and being driven by a drive means for a guided movement along the stationary guiding; and
a link member having a first end that hingeably engages the closure means and an opposite second end that slidingly and hingeably engages the stationary guiding, and which link member further is operatively connected to the slide in such a manner, that when the slide moves from a position in which the closure means closes the roof opening towards a position in which the closure means exposes the roof opening the link member firstly rotates such as to move the respective edge of the closure means away from the fixed roof construction and thereafter moves along with the slide while maintaining its rotated position such as to move the closure means substantially in parallel to the guiding, wherein the slide is provided with a curved track and the link member is provided with a coupling pin positioned intermediate its first end and opposite second end and housed within the curved track.

20. An open roof construction for a vehicle, comprising:
a roof opening defined in a fixed roof construction of the vehicle;
a panel-shaped closure means for the roof opening movable between a closing position for closing said roof opening and an opening position for at least partially exposing said roof opening, said closure means having a forward edge and a rearward edge, wherein during transition of the closure means from one of said positions towards the other of said positions at least one of said forward and rearward edges of the closure means also is moved in a direction towards or away from, respectively, the fixed roof construction; and
a guide mechanism providing for the movement of at least one of said edges of the closure means, said guide mechanism comprising:
a stationary guiding attached to the fixed roof construction and extending in the longitudinal direction of the vehicle;
a slide engaging the stationary guiding and being driven by a drive means for a guided movement along the stationary guiding; and
a link member having a first end that hingeably engages the closure means and an opposite second end that slidingly and hingeably engages the stationary guiding, and which link member further is operatively connected to the slide in such a manner, that when the slide moves from a position in which the closure means closes the roof opening towards a position in which the closure means exposes the roof opening the link member firstly rotates such as to move the respective edge of the closure means away from the fixed roof construction and thereafter moves along with the slide while maintaining its rotated position such as to move the closure means substantially in parallel to the guiding, wherein the slide comprises a locking member for locking a pin of the closure means when the latter is in its closing position.

21. An open roof construction for a vehicle, comprising:
a roof opening defined in a fixed roof construction of the vehicle;
a panelshaped closure means for the roof opening movable between a closing position for closing said roof opening and an opening position for at least partially exposing said roof opening, said closure means having a forward edge and a rearward edge, wherein during transition of the closure means from one of said positions towards the other of said positions at least one of said forward and rearward edges of the closure means also is moved in a direction towards or away from, respectively, the fixed roof construction; and
a guide mechanism providing for the movement of at least one of said edges of the closure means, said guide mechanism comprising:
  a stationary guiding attached to the fixed roof construction and extending in the longitudinal direction of the vehicle;
  a slide engaging the stationary guiding and being driven by a drive means for a guided movement along the stationary guiding; and
  a link member having a first end that hingeably engages the closure means and an opposite second end that slidingly and hingeably engages the stationary guiding, and which link member further is operatively connected to the slide in such a manner, that when the slide moves from a position in which the closure means closes the roof opening towards a position in which the closure means exposes the roof opening the link member firstly rotates such as to move the respective edge of the closure means away from the fixed roof construction and thereafter moves along with the slide while maintaining its rotated position such as to move the closure means substantially in parallel to the guiding, wherein the slide comprises a hook member for engaging a co-operating part of the link member in its rotated position.

22. An open roof construction for a vehicle, comprising:
a roof opening defined in a fixed roof construction of the vehicle;
a panelshaped closure means for the roof opening movable between a closing position for closing said roof opening and an opening position for at least partially exposing said roof opening, said closure means having a forward edge and a rearward edge, wherein during transition of the closure means from one of said positions towards the other of said positions at least one of said forward and rearward edges of the closure means also is moved in a direction towards or away from, respectively, the fixed root construction; and
a guide mechanism providing for the movement of at least one of said edges of the closure means, said guide mechanism comprising:
  a stationary guiding attached to the fixed roof construction and extending in the longitudinal direction of the vehicle;
  a slide engaging the stationary guiding and being driven by a drive means for a guided movement along the stationary guiding; and
  a link member having a first end that hingeably engages the closure means and an opposite second end that slidingly and hingeably engages the stationary guiding, and which link member further is operatively connected to the slide in such a manner, that when the slide moves from a position in which the closure means closes the roof opening towards a position in which the closure means exposes the roof opening the link member firstly rotates such as to move the respective edge of the closure means away from the fixed roof construction and thereafter moves along with the slide while maintaining its rotated position such as to move the closure means substantially in parallel to the guiding, wherein the respective edge of the closure means is the rearward edge, and wherein further a guide mechanism is provided for the movement of the forward edge of the closure means, said guide mechanism comprising:
  a stationary guide track attached to the fixed roof construction, with a first section forwardly extending substantially in parallel to the stationary guiding and backwardly merging into a second section extending transversally thereto in the direction of the fixed roof construction;
  a first guide pin attached to the closure means and engaging said stationary guide track; and
  a latching member connected with the slide for at least temporarily moving therewith along the stationary guiding, said latching member comprising a latching track with a first part substantially in parallel with the stationary guiding and a second part diverging backwardly therefrom towards the closure means, whereas the closure means comprises a second guide pin to be engaged by the latching track of the latching member when the closure means moves towards the closing position.

* * * * *

UNITED STATES PATENT AND TRADEMARK OFFICE
CERTIFICATE OF CORRECTION

PATENT NO. : 7,267,397 B2  Page 1 of 1
APPLICATION NO. : 10/516219
DATED : September 11, 2007
INVENTOR(S) : Boutin et al.

It is certified that error appears in the above-identified patent and that said Letters Patent is hereby corrected as shown below:

Col. 8, line 19: Change "comprises, a first" to --comprises a first--

Col. 8, line 21: Change "arcshaped" to --arc-shaped--

Col. 11, line 4: Change "panelshaped" to --panel-shaped--

Col. 11, line 42: Change "panelshaped" to --panel-shaped--

Col. 12, line 2: Change "root" to --roof--

Signed and Sealed this

Twenty-ninth Day of April, 2008

JON W. DUDAS
*Director of the United States Patent and Trademark Office*